US006593948B1

(12) United States Patent
Suetani et al.

(10) Patent No.: US 6,593,948 B1
(45) Date of Patent: Jul. 15, 2003

(54) CHARACTER INFORMATION PROCESSOR

(75) Inventors: Takuya Suetani, Tokyo (JP); Tomoki Nakamura, Tokyo (JP); Nobuyuki Horii, Tokyo (JP); Hideyuki Tsukuda, Suwa (JP)

(73) Assignees: King Jim Co., Ltd. (JP); Seiko Epson Corporation (JP)

( * ) Notice: Subject to any disclaimer, the term of this patent is extended or adjusted under 35 U.S.C. 154(b) by 0 days.

(21) Appl. No.: 09/413,324

(22) Filed: Oct. 6, 1999

(30) Foreign Application Priority Data

Oct. 13, 1998 (JP) .......................... 10-290643
Aug. 4, 1999 (JP) .......................... 11-220755

(51) Int. Cl.[7] ............................... G09G 5/00
(52) U.S. Cl. ..................... 345/841; 345/619; 345/467
(58) Field of Search ................. 345/100, 841, 345/636, 619, 159, 160, 163, 162, 533, 156, 157, 467, 468, 469

(56) References Cited

U.S. PATENT DOCUMENTS

| 4,731,735 A | * | 3/1988 | Borgendale et al. | ........ 364/200 |
| 4,954,981 A | * | 9/1990 | Dehner, Jr. et al. | ......... 364/900 |
| 5,067,070 A | * | 11/1991 | Miyao et al. | ................ 395/146 |
| 5,163,150 A | * | 11/1992 | Matsushima et al. | ....... 395/725 |
| 5,287,448 A | | 2/1994 | Nicol et al. | .................. 395/159 |
| 5,289,573 A | | 2/1994 | Kataoka et al. | ............. 395/156 |
| 5,436,637 A | | 7/1995 | Gayraud et al. | ............. 345/116 |
| 5,454,072 A | * | 9/1995 | Aoyama | ..................... 395/146 |
| 5,999,228 A | * | 12/1999 | Matsuura et al. | ........... 348/569 |
| 6,223,342 B1 | * | 4/2001 | George | ........................ 717/10 |

FOREIGN PATENT DOCUMENTS

| EP | 0 762 263 A2 | 8/1996 |
| JP | 8156336 | 6/1996 |
| JP | 9185619 | 1/1997 |

* cited by examiner

*Primary Examiner*—Vijay Shankar
*Assistant Examiner*—Mansour M. Said
(74) *Attorney, Agent, or Firm*—Lorusso, Loud & Kelly

(57) ABSTRACT

A character information processor including display means having a display area in which a limitation is imposed on an allowable number of lines of a character string to be displayed, including: means for dividing the display area into at least a function display region and a guidance display region in a function mode in which a function is selected; and means for displaying, at the function display region, options of a function menu in a hierarchical manner, and for displaying, at the guidance display region, an explanatory sentence corresponding to an option designated out of the options displayed at the function display region.

11 Claims, 14 Drawing Sheets

FIG.4

■ DOCUMENT FORMAT

| LAYER | FIRST LAYER | | SECOND LAYER | | THIRD LAYER | | | FOURTH LAYER | | |
|---|---|---|---|---|---|---|---|---|---|---|
| | | | | | Type 1 | Type 2 | | Type 1 | Type 2 | |
| | | Type 1 | Type 2 | | | | | | | |
| TITLE | DOCUMENT FORMAT__ | | | | | | | | | |
| OPTION | _BACKGROUND PATTERN PRINTING | 6 | _ NONE 00<br>■ ■SEA WAVE 01<br>⋮<br>■ ■CUTOUT 10 | A | | | | | | |
| | | | _CHARACTER BACKGROUND PATTERN<br>⋮ | 46 | | | | | | |
| | | | ■_CREATION 12<br>⋮<br>■_CREATION 15 | 47 | | | | 57 | | A |
| | _FIXED LENGTH PRINTING | 7 | _MD<br>⋮ | | ■LEFT JUSTIFICATION<br>■CENTER JUSTIFICATION<br>■EQUAL SPACE<br>■RIGHT JUSTIFICATION | A | | | | |
| | | | _ OFF | A | | | | | | |
| | | | _1.0cm<br>⋮<br>_.95cm | | ■LEFT JUSTIFICATION<br>■CENTER JUSTIFICATION<br>■EQUAL SPACE<br>■RIGHT JUSTIFICATION | A | | | | |
| | _MARGIN | 8 | _ZERO<br>_AUTO (SHORT)<br>_AUTO (LONG)<br>_EXTREMELY SHORT<br>_RELATIVELY SHORT<br>_MEDIUM<br>_RELATIVELY LONG | A | | | | | | |
| | _END ? | 9 | | | | | | | | |

FIG.5

| Type 1 | EXPLANATORY SENTENCE | Type 1 | EXPLANATORY SENTENCE |
|---|---|---|---|
| 1 | SAME LABELS ARE PRINTED CONSECUTIVELY | 8 | MARGIN OF ENTIRE LABEL IS SPECIFIED |
| ⋮ | ⋮ | 9 | "DOCUMENT FORMAT" IS TERMINATED |
| 6 | PATTERN IS PRINTED AS BACKGROUND | | ⋮ |
| 7 | LENGTH OF ENTIRE LABEL IS SPECIFIED | 58 | INFORMATION OF TEL/FAX NO. IS DISPLAYED |

FIG.6

| Type 2 | OPERATION GUIDE |
|---|---|
| A | (SELECT) DETERMINE<br>← ↑ ↓ → CHANGE<br>(DELETE) RETURN |
| B | (SELECT) DETERMINE<br><br>(DELETE) RETURN |
| C | A or B ? |

FIG.9
| NAME OF FUNCTION KEY | TITLE |
|---|---|
| CONSECUTIVELY/ GREATLY ENLARGED | SPECIAL PRINTING |
| FORMAT | DOCUMENT FORMAT |
| STYLE | PARAGRAPH STYLE |
|  |  |
FIG.10(A)
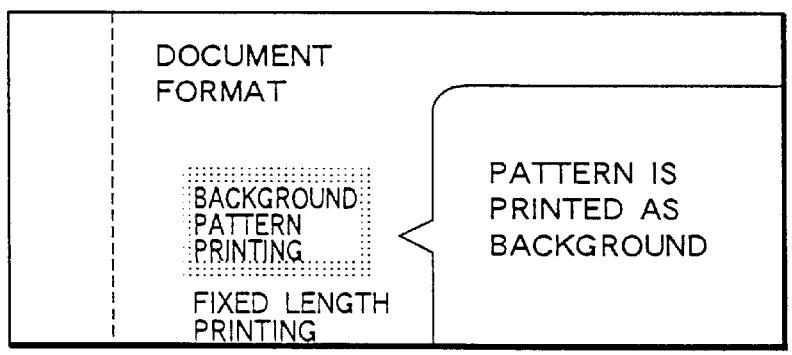
FIG.10(B)
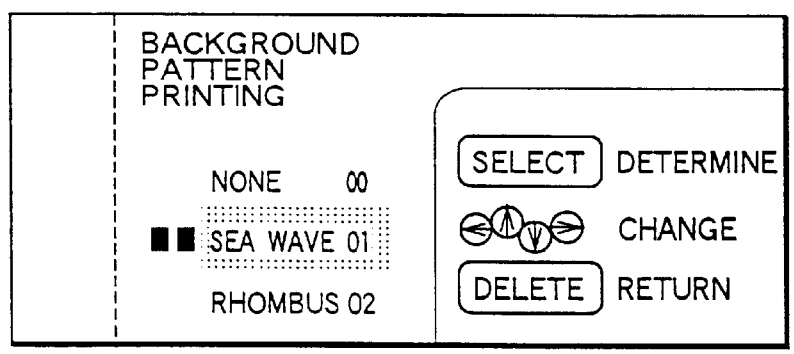

FIG.12(A)

STATE 201
```
❶TIME AND TIDE WAIT FOR NO MAN
❷ABCDEFG
```

↓ [FORMAT] KEY

STATE 202
```
DOCUMENT FORMAT
  BACKGROUND PATTERN PRINTING
  FIXED LENGTH PRINTING
  MARGIN
```

↓ [↑] or [←] KEY

STATE 203
```
DOCUMENT FORMAT

BACKGROUND PATTERN PRINTING
  FIXED LENGTH PRINTING
```

↓ [SELECT] KEY (WITHIN ONE SECOND)

STATE 204
```
BACKGROUND PATTERN PRINTING
  NONE     00
  SEA WAVE 01
```

↓ ONE SECOND AFTER

STATE 205
```
BACKGROUND PATTERN PRINTING          [SELECT] DETERMINE
  NONE     00                         ⊖⊙⊙⊕   CHANGE
  SEA WAVE 01                        [DELETE] RETURN
```

↓ [↓] or [→] KEY

STATE 206
```
BACKGROUND PATTERN PRINTING
    NONE      00
  ■ SEA WAVE 01
    RHOMBUS  02
```

↓ ONE SECOND AFTER

STATE 207
```
BACKGROUND PATTERN PRINTING          [SELECT] DETERMINE
    NONE      00                      ⊖⊙⊙⊕   CHANGE
  ■ SEA WAVE 01                      [DELETE] RETURN
    RHOMBUS  02
```

STATE 208 ← [↓] or [→] KEY

```
BACKGROUND PATTERN PRINTING
   SEA WAVE              00
■■ RHOMBUS               02
   RHOMBIC HALF-TONE DOT MESHING 03
```

↓ [↑] or [←] KEY (WITHIN ONE SECOND)

STATE 209

```
BACKGROUND PATTERN PRINTING
   RHOMBUS               02
■■ RHOMBIC HALF-TONE DOT MESHING 03
   SNOW                  04
```

↓ ONE SECOND AFTER

STATE 210

```
BACKGROUND PATTERN PRINTING
   RHOMBUS               02          [SELECT] DETERMINE
■■ RHOMBIC HALF-TONE DOT MESHING 03           CHANGE
   SNOW                  04          [DELETE] RETURN
```

↓ [SELECT] KEY

STATE 211

```
DOCUMENT FORMAT
  BACKGROUND PATTERN PRINTING
  FIXED LENGTH PRINTING
  MARGIN
```

↓ [↓] or [→] KEY (WITHIN ONE SECOND)

STATE 212

```
DOCUMENT FORMAT
  FIXED LENGTH PRINTING
  MARGIN
  END ?
```

↓ [↓] or [→] KEY (WITHIN ONE SECOND)

STATE 213

```
BACKGROUND PATTERN PRINTING
  MARGIN
  END ?
```

↓ [SELECT] KEY (WITHIN ONE SECOND)

STATE 214

```
❶ TIME AND TIDE WAIT FOR NO MAN
❷ ABCDEFG
```

CHARACTER INFORMATION PROCESSOR

CROSS REFERENCE TO RELATED APPLICATIONS

This application claims, under 35 USC 119, priority of Japanese Application No. 11-220755 filed Aug. 4, 1999 and Japanese Application No. 10-290643 filed Oct. 13, 1998.

BACKGROUND OF THE INVENTION

1. Field of the Invention

The present invention relates to a character information processor. The present invention can be applied to, for example, a tape printing apparatus adapted to print a character string on a surface of a tape, and a stamp producing apparatus adapted to produce a stamp having an uneven pattern corresponding to a character string by using, as a mask, a tape having a transparent pattern in the form of the character string.

2. Discussion of Related Art

A tape printing apparatus and a stamp producing apparatus are very useful apparatuses adapted to produce an originally prepared label or stamp, which can provide a variety of expressions. These apparatuses have some common features in constitution, although they produce different products: a label and a stamp.

More particularly, these apparatuses are common in that they are electronic apparatuses each including: a console panel for inputting characters (the term "character" as used herein includes a symbol, and an ideogram such as a pictograph); an information processing unit for processing an input character string, etc.; a display unit for displaying input result and processing result; a tape feeding mechanism for feeding a tape serving as an object of printing to a predetermined place to position it there; and a print mechanism for printing the character string, etc. on the tape thus positioned.

The difference between them is that the stamp producing apparatus has, in addition to the above-mentioned members, an optical mechanism adapted to transfer a character string to a surface of the tape by using, as a mask, an ink ribbon or tape having a transparent pattern in the form of the character string, etc.

These apparatuses also have a common feature in function in that both of them have a "function mode". The "function mode" is a mode in which the user can select one of the various function menus (such as character mode, paragraph style, document format, special printing, and so on) and causes the function of the selected function menu to be executed by selecting options of the function menu which are hierarchically arranged to make the most of the limited display area so as to enhance user interface.

The function mode is very useful because the user can cause a desired function to be executed only by selecting options displayed at the display area in a hierarchical manner. However, information on function or operation provided by the option itself is so scarce that the users in some cases have difficulty in understanding what function is achieved by selecting the options and/or what operations should be performed in relation to the displayed option. Therefore, users who are not accustomed to using the apparatus, in some cases, need to consult the manual or the like annexed to the apparatus to find the operations to perform every time they encounter an unknown option.

SUMMARY OF THE INVENTION

The present invention is accomplished in view of the above problem. It is therefore an object of the present invention to further enhance user interface.

(A) To achieve the above object, a first aspect of the present invention provides a character information processor including display means having a display area in which a limitation is imposed on an allowable number of lines of a character string to be displayed, comprising:
  means for dividing the display area into at least a function display region and a guidance display region in a function mode in which a function is selected; and
  means for displaying, at the function display region, options of a function menu in a hierarchical manner, and for displaying, at the guidance display region, an explanatory sentence corresponding to an option designated out of the options displayed at the function display region.

Owing to this constitution, the user can confirm, by means of the explanatory sentence displayed at the guidance display region, the gist of the function to be executed when the designated option is selected, while keeping the option and the corresponding explanatory sentence displayed concurrently on the same display area, so that he can perform operations effectively.

(B) A second aspect of the present invention provides a character information processor including display means having a display area in which a limitation is imposed on an allowable number of lines of a character string to be displayed, comprising:
  means for dividing the display area into at least a function display region and a guidance display region in a function mode in which a function is selected; and
  means for displaying, at the function display region, options of a function menu in a hierarchical manner, and for displaying, at the guidance display region, an operation guide corresponding to an option designated out of the options displayed at the function display region.

Owing to this constitution, the user can judge, without hesitation, which key should be operated to determine the designated option as a final input, which key should be operated in order to designate another option, which key should be operated to return to the upper layer, and so on, while keeping the option and the corresponding operation guide displayed concurrently on the same display area, so that he can perform operations effectively.

(C) A third aspect of the present invention provides a character information processor having, in addition to the features of the character information processor according to the first aspect of the present invention, in addition to a feature that there is provided means for displaying, at the function display region, an operation guide instead of an explanatory sentence when the option designated out of the options displayed at the function display region is a predetermined option.

Owing to this constitution, the user can confirm, by means of the explanatory sentence displayed at the guidance display region, the gist of the function to be executed when the designated option is selected, while keeping the option and the corresponding explanatory sentence displayed concurrently on the same display area, or can judge which key should be operated to perform an appropriate operation with respect to the designated option, and so on.

(D) A fourth aspect of the present invention provides a character information processor having, in addition to the features of the character information processor according to any one of the first to third aspect of the present invention, a feature that, when no key operation is performed within a predetermined period of time after the, performance the previous operation in the function mode, either an explanatory sentence or an operation guide is displayed.

That is, according to the fourth aspect of the invention, displaying the guidance (i.e., explanatory sentence or operation guide) is conducted at the moment when a predetermined period of time has passed after the performance of the previous operation. This constitution satisfies the needs of the users who wish to confirm the explanatory sentence or operation guide only when necessary.

(E) A fifth aspect of the present invention provides a character information processor having, in addition to the features of the character information processor according to the first or third aspect of the present invention, a feature that the option and the explanatory sentence are displayed in different languages. Owing to this constitution in which this further feature is added, even when the user can understand his native language but cannot understand the language of the country where he lives, he can perform an appropriate operation on the basis of the language which he can understand.

Similarly, a sixth aspect of the present invention provides a character information processor having, in addition to the features of the character information processor according to the second or third aspect of the present invention, a feature that the option and the operation guide are displayed in different languages.

BRIEF DESCRIPTION OF THE DRAWINGS

Other features, objects and advantages of the present invention will become apparent from the following description of the preferred embodiments with reference to the drawings in which like reference characters designate like or corresponding parts throughout several views, and in which:

FIG. 4 is a view showing an example of storage contents of a correspondence relation file;

FIG. 5 is a view showing an example of storage contents of an explanatory sentence file;

FIG. 6 is a view showing an example of storage contents of the operation guide file;

FIG. 9 is a view showing an example of correspondence relationships each between a function key and a function menu, for which explanatory sentences and operation guides are provided;

FIG. 10(A) is a view showing a state in which an option and its corresponding explanatory sentence are displayed concurrently, and FIG. 10(B) is a view showing a state in which an option and its corresponding operation guide are displayed concurrently;

FIG. 12(A), and FIG. 12(B), which is a continuation of the sequence of FIG. 12(A), are views showing how the displayed state at the display screen changes in the case where operation guides are displayed.

DETAILED DESCRIPTION OF THE INVENTION

Hereinafter, an example of a tape printing apparatus as an embodiment of a character information processor according to the present invention will be described with reference to the attached drawings.

(A) Constitution of the Embodiment

First, referring to the functional block diagram in FIG. 2, an overall constitution of the tape printing apparatus according to the present embodiment will be described.

Figure 2:
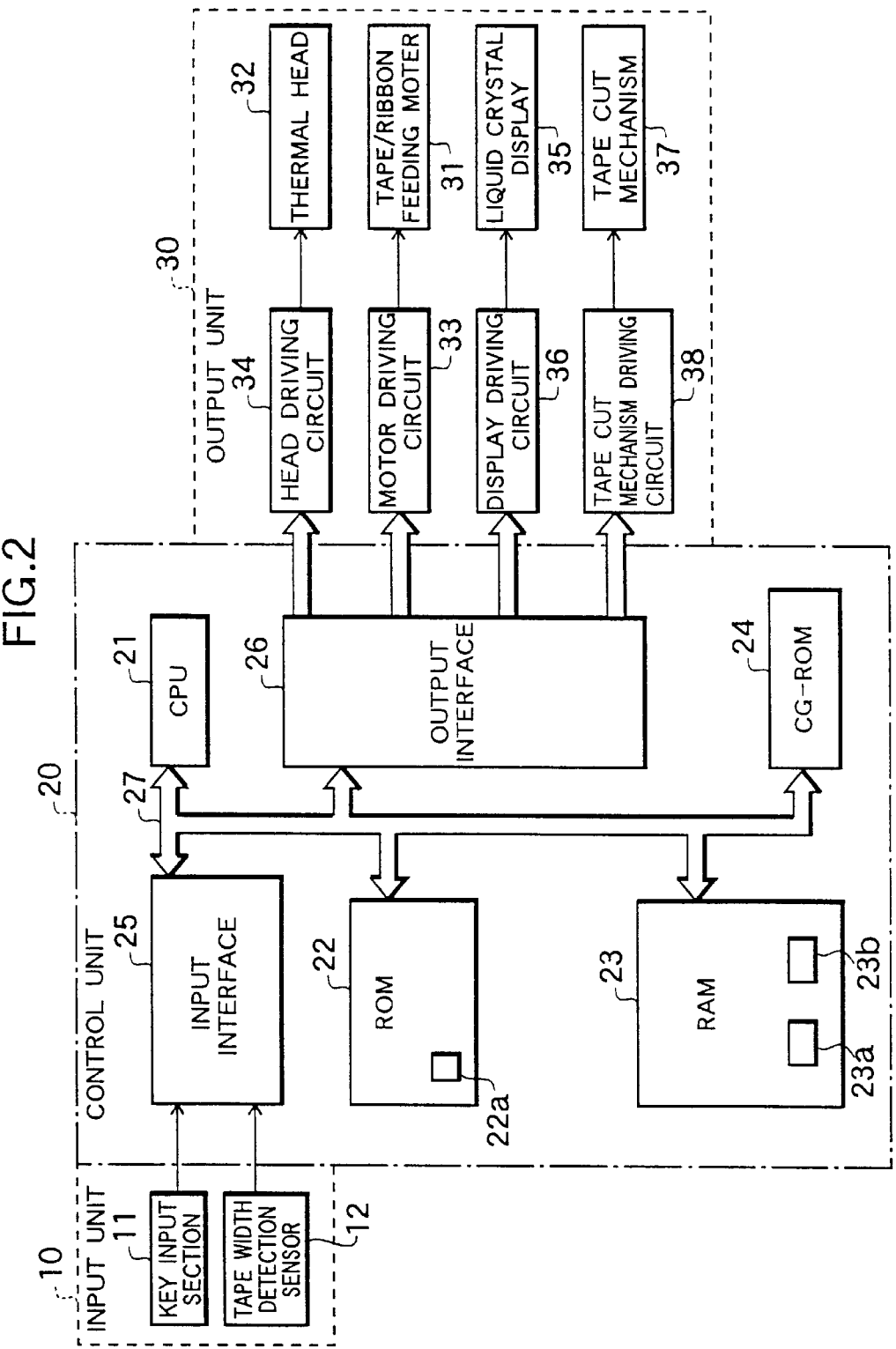
FIG. 2 is a view showing an embodiment of a character information processor.

As shown in FIG. 2, similarly to the other character information processor, the tape printing apparatus of the present embodiment roughly includes three functional blocks: an input unit 10, a control unit 20, and an output unit 30. These three blocks are arranged with the control unit 20 as the central block. The control unit 20 is adapted to execute processing in accordance with information supplied from the input unit 10, a processing stage at that time, and so on, and to control a display or print output of the output unit 30 on the basis of the result of the processing of the control unit 20.

Hereinafter, the constitutions of the respective members or elements will be described.

The input unit 10, while not detailed, includes a key input unit 11, which has a depressing key, a dial key and the like, a tape width detection sensor 12. The key input unit 11 is adapted to generate character code data and various types of control data to be supplied to the control unit 20. The tape width detection sensor 12 is adapted to detect the width of the loaded tape and to supply tape width information to the control unit 20. In actual, detecting the tape width by the sensor 12 is conducted by reading a physical identification element (e.g., a hole) provided on a tape cartridge and representing the width of the tape accommodated in the tape cartridge.

The output unit 30 includes members serving as a print mechanism and members serving as a display mechanism.

The print mechanism includes a tape/ribbon feeding motor 31 and a thermal head 32. The tape/ribbon feeding motor 31, which is constituted by, for example, a stepping motor, is adapted to feed a tape or an ink ribbon loaded in the tape printing apparatus (both not shown) to a predetermined printing position or to the outside of the tape printing apparatus. The thermal head 32 is fixed, and adapted to perform printing on the running tape by the thermal transferring method. The tape/ribbon feeding motor 31 is driven by a motor driving circuit 33, and the thermal head 32 is driven by the head driving circuit 34, both driven under the control of the control unit 20. To cut the tape on which printing is completed, a tape cutting mechanism 37 is provided. The tape cutting mechanism 37 is driven by the cutting mechanism driving circuit 38 under the control of the control unit 20. The apparatus may be configured in such a manner that the tape is cut by force applied by the user.

Figure 3:
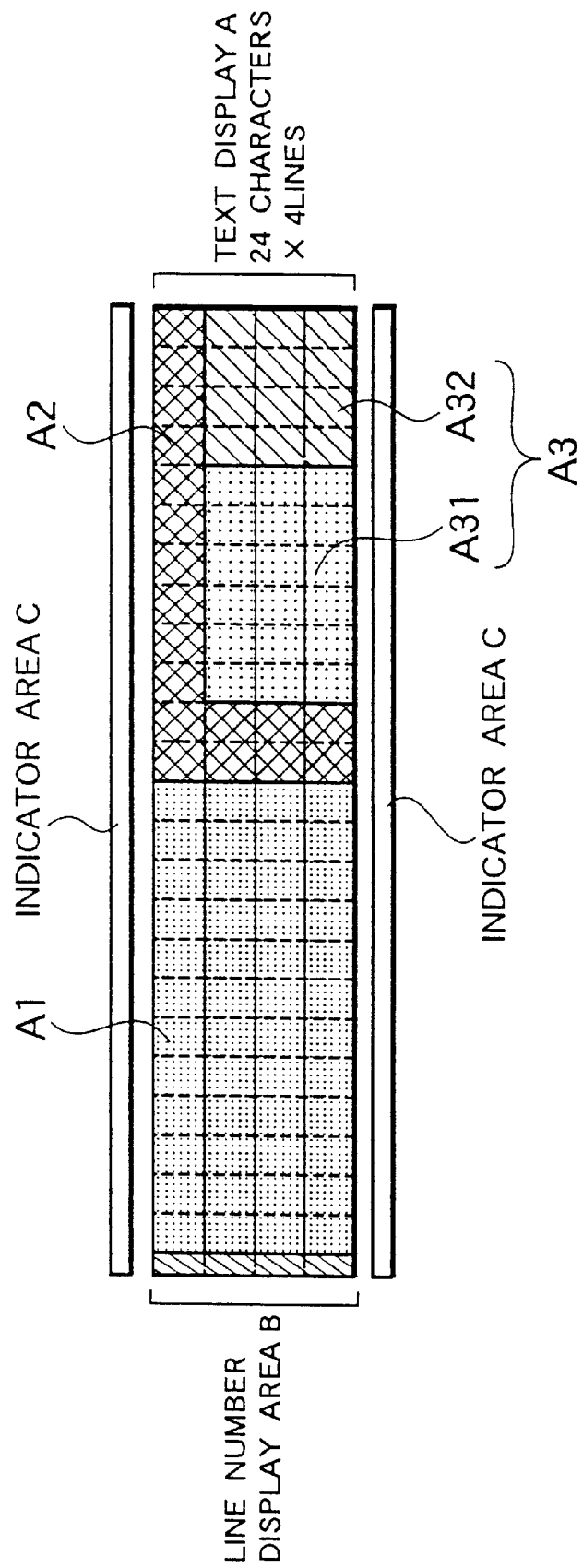
FIG. 3 is a view showing an embodiment of a liquid crystal display.

In the case of the tape printing apparatus, the display mechanism includes a liquid crystal display 35. An example of the liquid crystal display 35 according to the present embodiment is shown in FIG. 3. The liquid crystal display 35 is driven by a display driving circuit 36 under the control of the control unit 20. The liquid crystal display 35 is adapted to directly display the input character string, various attribute information, and so on, and light each indicator which indicates an on-off state of the attribute (such as character size, input line, and so on) denoted by the characters each of which are printed at a portion surrounding the display 35 and corresponding to each indicator. The liquid crystal display 35 employed in this embodiment is of the type that can display text characters in 4 lines of 24 characters per line (i.e., in 24 characters×4 lines).

The control unit 20, which is constituted by, for example, a microcomputer, includes a CPU 21, a ROM 22, a RAM 23, a character generator ROM (CG-ROM) 24, an input interface 25 and an output interface 26, which are connected one another via a system bus 27.

The ROM 22 stores fixed data, including various kinds of processing programs, a kana-kanji conversion dictionary, and the like. The RAM 23 is used as a working memory which stores fixed data input by the user. The RAM 23 is backed-up even while the electric power is turned off. It should be noted that, although in FIG. 2 the RAM 23 is constituted as an internal RAM, the RAM 23 may be constituted as a combination of such an internal RAM and an add-on RAM.

The ROM 22 stores a function menu program 22A, a correspondence relation file set 22B, an explanatory sentence file 22C and an operation guide file 22D. In the RAM 23, print buffer 23A and display buffer 23B are appropriately formed.

Among them, the correspondence relation file set 22B stores a set of files each of which stores a correspondence relation between a hierarchical structure of options corresponding to a function, and a guidance (i.e., an explanatory sentence or an operation guide) to be displayed in a guidance screen region. For example, in the case of the function menu of "document format", the correspondence relation table as shown in FIG. 4 is stored as one file.

The term "explanatory sentence" as used herein refers to a description in the form of a sentence for briefly explaining a function corresponding to an option. By contrast, the term "operation guide" refers to an illustration in the form of an image or in the form of a combination of an image and a character, for explaining the correspondence relationships between a key operation and its processing contents, both in connection with an option. In this specification, the terms "explanatory sentence" and "operation guide" are occasionally mentioned as "guidance" which serves as a generic term of the terms "explanatory sentence" and "operation guide".

The columns entitled "type 1" (hereinafter, each of the columns entitled "type 1" will be occasionally referred to as "type 1 column") in FIG. 4 are columns each in which a numeral for specifying an explanatory sentence corresponding to an option is set forth. Each of the numerals set forth in the columns coincides with each of the serial numbers provided in the explanatory file 22C which will be described later. That is, the explanatory sentence corresponding to an option is denoted by the numeral set forth in the type 1 column formed next to the column in which the option is set forth. The columns entitled "type 2" (hereinafter, each of the columns entitled "type 2" will be occasionally referred to as "type 2 column") are columns each in which an alphabetic character for specifying an operation guide corresponding to an option is set forth. Each of the alphabetic characters set forth in the columns coincides with each of the alphabetic characters stored in the operation guide file 22D which will be described later. That is, the operation guide corresponding to an option is denoted by the alphabetic character set forth in the type 2 column formed next to the column in which the option is set forth.

The explanatory sentence file 22C stores various explanatory sentences as shown in FIG. 5. An identification number (in the present embodiment, one of serial numbers) is allocated to each explanatory sentence for identification purposes. The operation guide file 22D stores a plurality of images used as operation guides as shown in FIG. 6. In the present embodiment, three types of images are stored, as shown in FIG. 6.

The CG-ROM 24 is adapted to store font information of the letters and symbols provided in the tape printing apparatus and to output, when code data for specifying a letter or symbol are supplied. The font information stored in the CG-ROM 24 may be either an outline font or a bit map font. Further, font information may differ between display specific font and print specific font.

The input interface 25 is adapted to interface between the input unit 10 and the control unit 20. The output interface 26 is adapted to interface between the output unit 30 and the control unit 20.

The CPU 21 is adapted to execute a processing program stored in the ROM 22 that is determined in accordance with an input signal sent from the input unit 10 and a processing stage at that time while utilizing the RAM 23 as a working area or, if necessary, appropriately using fixed data stored in the ROM 22 or RAM 23. Also, the CPU 21 is adapted to cause the liquid crystal display 35 to display the state or result of the processing, or cause the print mechanism to print on the tape (not shown)

(B) Screen Display in Function Mode

One of the characteristic features of the tape printing apparatus according to the present embodiment is that an option and its corresponding guidance (i.e., explanatory sentence or operation guide) can be confirmed concurrently on the same display screen. It should be noted that options in a function menu are arranged hierarchically.

To secure this characteristic feature, in the tape printing apparatus according to the present embodiment, the display area of the liquid crystal display 35 in the function mode is divided into two regions: a left half region and a right half region, as shown in FIGS. 7(A) to 7(C) and 8(A) to 8(C). More particularly, the left half region (i.e., the region formed by four lines of 12 characters existing at the $1^{st}$ to $12^{th}$ columns of each line, in each figure) is used as a function screen region for displaying options which are arranged hierarchically and each of which corresponds to a function. The right half region (i.e., the region formed by four lines of 12 characters existing at the $13^{th}$ to $24^{th}$ columns of each line, in each figure) is used as a guidance screen region for displaying a guidance corresponding to a designated option.

The function display region is denoted by a reference symbol A1. On the other hand, The guide screen region includes: a picture image display region A2 which displays picture images to distinguish the guidance screen region from the function display region A1, which neighbors the guidance screen region; and a guidance display region A3 which displays a guidance corresponding to an option currently designated and displayed at the function screen region (see FIGS. 3 and 7(A)).

First, the picture image display region A2 will be described. More particularly, a plurality of specific fonts used for the region A2 are provided. This is because, if the plurality of specific fonts for the region A2 are used properly according to the type of the guidance displayed at the guidance screen region A3 (that is, depending on whether the guidance is an explanatory sentence or an operation guide), the user can more easily discern the type of the guidance also by observing the shape of the font used for the region A2. An example of the specific font for an explanatory sentence is a font whose displayed image is in the shape of balloon as shown in FIG. 7(B). An example of the specific font for the operation guide is a font whose displayed image is in the shape of an enclosure pattern as shown in FIG. 7(C).

Next, the guidance display region A3 will be described. More particularly, fonts used for the region A3 differ depending on the contents displayed at the region A3.

Specifically, in the case of an explanatory sentence, the displayed contents are all text characters. Therefore, fonts used for the display at the region A3 are ordinary character fonts only.

By contrast, in the case of an operation guide, a plurality of display patterns exist, so that fonts used for the display at the region A3 differ according to the display patterns.

Figure 8A:
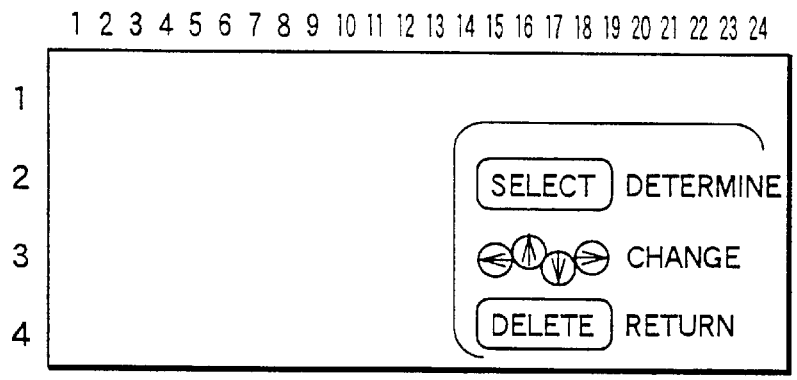
FIGS. 8(A) to 8(C) are views each showing how an operation guide is displayed at the guidance display screen.

For example, in the case of the display pattern shown in FIG. 8(A) (i.e., type 2=A), picture images of keys, each of which represents an operation to be performed in connection with a designated option are displayed in a specific display font at a region: A31, and the contents of the operations to be performed in connection with the designated option are displayed in an ordinary character font at the region A32.

Figure 8B:
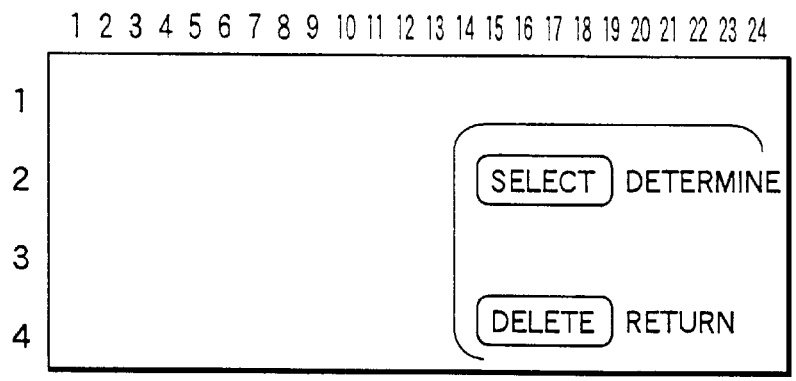

In the case of the display pattern shown in FIG. 8(B) (i.e., type 2=B), picture images of keys, each of which represents an operation to be performed in connection with a designated option, are displayed in a specific display font at the region A31, and the contents of the operations to be performed in connection with the designated option are displayed in an ordinary character font at the region A32.

Figure 7A:
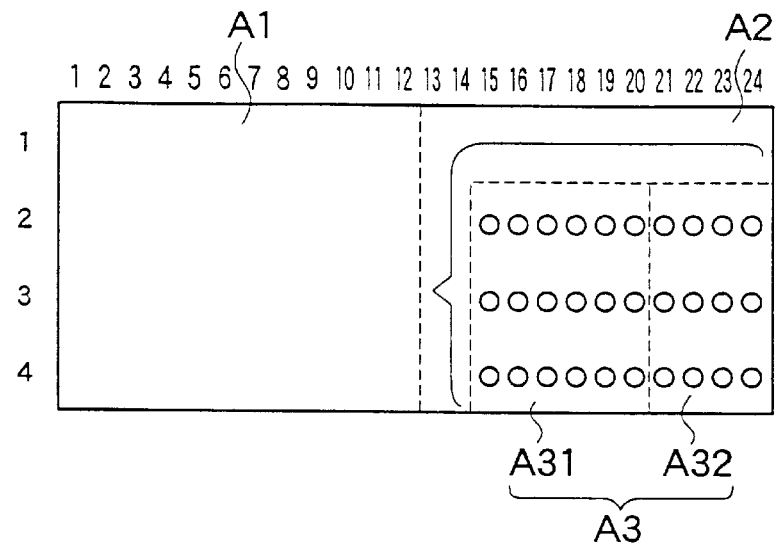
FIGS. 7(A) to 7(C) are views each showing a display example of an explanatory sentence at the guidance screen region.
Figure 7B:
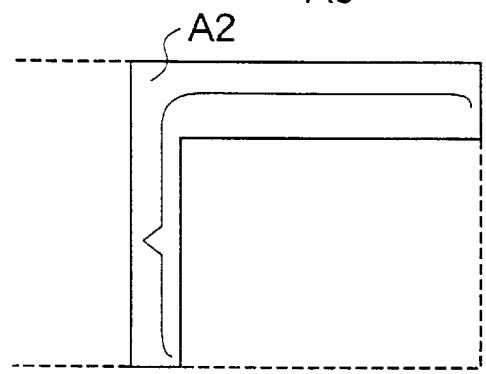
Figure 7C:
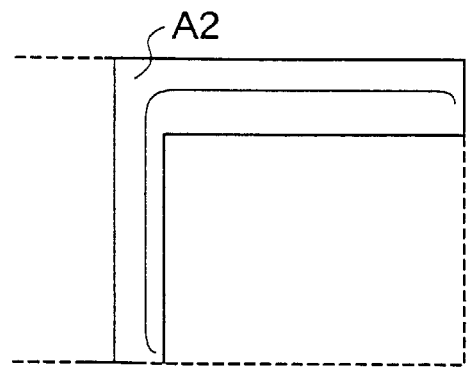

Here, it should be noted that the region A3 is divided into the two regions A31 and A32 as shown in FIG. 7(A), and that, in the cases of FIGS. 8(A) and 8(B) different fonts are used for the respective two regions A31 and A32. Further, the display patterns in the cases of FIG. 8(A) and FIG. 8(B) are same in the respects of the types of fonts and division of the region A3 into the two regions A31 and A32. The only difference between-the cases of FIG. 8(A) and FIG. 8(B) is the number of operations (i.e., three in the former case, while two in the latter case), which reflects the difference in the type of the designated option.

Figure 8C:
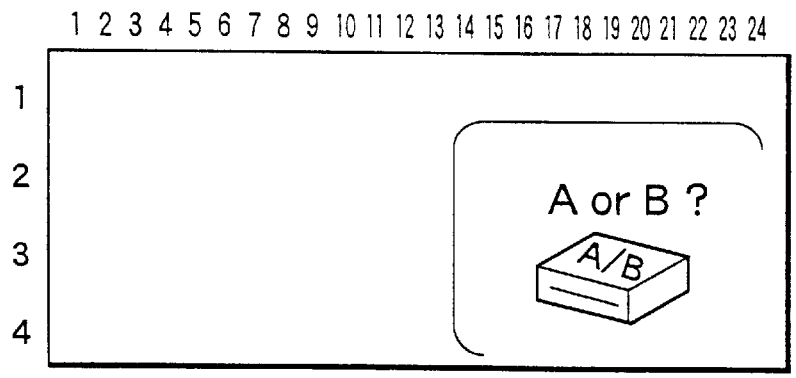

In the case of the display pattern shown in FIG. 8(C) (i.e., type 2=C), a picture image of operations to be performed in connection with a designated operation is displayed in a specific display font at the entire region A3.

(C) Processing Actions in Function Mode

Hereinafter, operations performed by the user and actions executed by the apparatus under a function mode in the tape printing apparatus having the above-described function arrangement and display functions, in particular, operations and actions in relation to the display of a function menu will be described.

Figure 1:
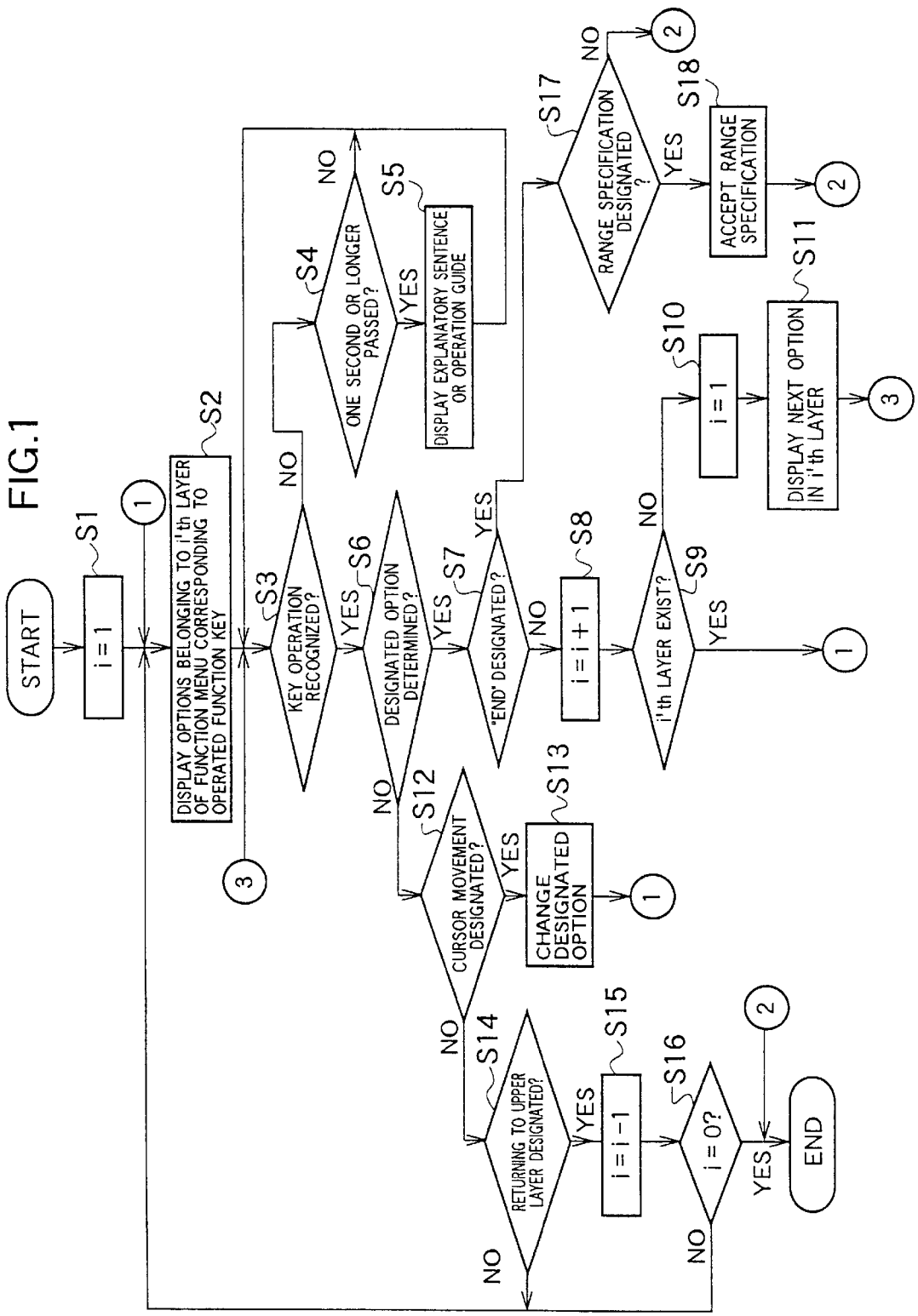
FIG. 1 is a view showing an embodiment of a function menu program.

The following descriptions will be made with reference to FIG. 1. FIG. 1 is a flowchart of the function menu program 22A which performs actions to realize the function of the designated function menu.

The function menu program 22A is activated when one of the function keys each corresponding to one function menu is operated. With respect to each function menu, explanatory sentences and operation guides are provided. In the present embodiment, it is assumed that, when any one of the function keys shown in FIG. 9 is operated, the function menu program 22A shown in FIG. 1 is activated. The relationships between function keys and their corresponding function menus according to the present embodiment (In the figure, the names of function menus are set forth in the columns under the item of "title". The same shall apply hereinafter.) are shown in FIG. 9.

In the text input screen, when the function menu program 22A is initiated by operating one of the function keys shown in FIG. 9, the CPU 21 sets the initial value of the parameter i, which represents the menu layer, to 1 (step S1). The parameter i of 1 means that the current layer is the first layer.

After completing the setting of the initial value of the parameter i, the CPU 21 accesses the correspondence relation file set 22B to read options belonging to the first layer of the function menu (title) corresponding to the operated function key so as to display the options thus read at the function screen region A1 (step S2).

The display area of the liquid crystal display 35 can display four lines at the maximum. Among the four lines of the display area, the first line is allocated to name of the function menu (title). Accordingly, the number of lines that can be allocated to the display of the options is actually limited to three. Accordingly, when the number of options read out of the correspondence relation file 22B is three or smaller, all the options thus read are displayed (Therefore, if the number of options thus read is two, all the two options are displayed at two lines.). By contrast, when the number of options are four or more, only three of them are displayed.

Next, the CPU 21 judges whether or not any one of the keys is operated (step S3).

If a negative result is obtained at step S3, that is, it is judged at step 3 that no key operation is performed, the CPU 21 judges whether or not a period of time longer than one second has passed after the performance of the previous operation (i.e., the operation of the function key in this case) until the present moment (step S4). This judgement at step S4 is made because, in the present embodiment, the time threshold is set to one second, and the function of displaying the explanatory sentence is activated only when a period of time longer than the time threshold of one second has passed after the performance of the previous operation. Therefore, if the time threshold is set to another value than one second, the judgment at step 4 is made on the basis of the other time threshold than one second.

If at the moment when step S4 is executed, one second has not passed yet after performing the previous operation, the CPU 21 immediately returns to step S3 to judge again whether or not any key operation is performed while the judgement at step S3 is being made.

By contrast, if one second has already passed at the moment when the judgment at step 4 is made, the CPU 21 again accesses the correspondence relation file set 22B to read an explanatory sentence or operation guide corresponding to the currently designated option (which is usually displayed in a reverse manner) out of the correspondence relation file set 22B so as to display the explanatory sentence or operation guide thus read out at the guidance screen region (step S5). It should be noted that, throughout the specification, the language "X (e.g. character, character string, etc.) is displayed in a reverse manner" refers to a state in which X is displayed in such a manner that the portions surrounding the character are lit up while the character itself is not lit, as, for example, in the option "fixed length printing" shown in state 102 of FIG. 11(A). Such display is occasionally referred to as "reverse display".

More particularly, information that specifies the explanatory sentence or operation guide corresponding to an option (the information is expressed in the form of a numeral in the case of explanatory sentence, while the information is expressed in the form of an alphabetic letter in the case of the operation guide) is registered either at the type 1 column or at the type 2 column corresponding to the option (see FIG. 4). Under this configuration, the CPU 21. reads an explanatory sentence or operation guide specified by the information thus registered out of the explanatory sentence file 22C or operation guide file 22D so as to display the explanatory sentence or operation guide thus read at the guidance screen region. An example of the explanatory sentence is shown in FIG. 10(A), while an example of the operation guide is shown in FIG. 10(B). After completing the display at step S5, the CPU 21 returns to step S3.

The above descriptions have dealt with the actions executed when a negative result is obtained at step S3, that is, no key operation is recognized at step S3.

In the following, descriptions will be made as to the actions executed when a positive result is obtained at step S3, that is, when it is judged at step S3 that a key operation is recognized. It should be noted that, if a guidance (i.e., explanatory sentence or operation guide) remains at the display screen of the liquid crystal display 35 at the moment when a key operation is recognized, the CPU 21 deletes the displayed guidance from the display screen in parallel with executing the following actions.

More particularly, if a positive result is obtained at step S3, the CPU 21 judges whether or not a key operation of determining the currently designated option, which is displayed in a reverse manner, is recognized (step S6).

If a positive result is obtained at step S6, that is, if it is judged at step S6 that currently designated option is determined, the CPU 21 judges whether or not an option of terminating the current function menu (i.e., an option labeled "end") is selected (step S7).

If a negative result is obtained at step S7, that is, if it is judged at step S7 that the current function menu is not terminated, the CPU 21 updates the value of the parameter i representing the menu layer (step S8) by adding 1 to the value of the parameter i so as to switch the current layer to a layer lower, by one layer, than the current layer (In this specification, a layer lower, by one layer, than the current layer is occasionally referred to as "proximate lower layer"). For example, if the layer before the updating is the first layer, the first layer is switched to the second layer. It should be noted that switching the layer is conducted to alter the displayed options from the options belonging to current layer to the options belonging to the proximate lower layer.

After updating the value of the parameter i, the CPU 21 judges whether or not a layer indicated by the new value of parameter i obtained after the updating exists (step S9).

If it is judged at step S9 that the layer indicated by the new parameter i obtained after the updating exists, the CPU 21 returns to step S2 to display the options belonging to the layer denoted by the parameter i obtained after the updating, and thereafter repeats the above-mentioned processings. By contrast, if it is judged at step S9 that the layer indicated by the updated parameter i does not exist, the CPU 21 sets the value of the parameter i, representing the menu layer, to 1 so as to forcibly return to the first layer (step 10). Thereafter, the CPU 21 turns display of the next option in the first layer to a reverse display so as to show that the option displayed in a reverse manner is a newly designated option.

By contrast, if a positive result is obtained at step S7, that is, if it is judged at step S7 that the current function menu is terminated, the CPU 21 judges whether or not a second layer for enabling the user to perform range specification exists (step S17). Here, range specification is an operation to make effective the function set by the operations performed so far. If it is judged at step S17 that such a second layer exists, the CPU 21 firstly accepts range specification and then terminates the function menu program (step S18). By contrast, if it is judged at step S17 that such a second layer does not exist, the CPU 21 immediately terminates the function menu program. After terminating the function menu program, the text input screen is restored.

The above descriptions have dealt with the actions executed when a positive result is obtained at step S6, that is, it is judged at step S6 that an operation of determining the currently designated option is performed. In other words, the above descriptions are directed to the actions executed when an operation of switching the options displayed at the function screen region from the options belonging to the current layer to those belonging to a proximate lower layer.

In the following, descriptions are given to the actions when a negative result is obtained at step 6, that is, it is judged at step 6 that an operation other than determining the currently designated option is performed.

More particularly, if a negative result is obtained at step S6, the CPU 21 judges whether or not the recognized operation is an operation of moving the cursor from the current option to another option (cursor movement operation) in the same layer (step S12). It should be noted that the operation of moving the cursor is usually performed by depressing one of the arrow keys ("←", "→", "↑" and "↓").

When a positive result is obtained at step S12, that is, when it is judged at step S12 that a cursor movement operation is performed, the CPU 21 changes designated option from the current option to another option which exists in the same layer and which is specified by the cursor movement key operation (step S13). Thereafter, the CPU 21 returns to step S2 to display the new option at the function menu screen.

By contrast, when a negative result is obtained at step S12, that is, when it is judged at step S12 that any cursor movement operation is not performed, the CPU 21 judges whether or not the recognized operation is an operation of returning the menu layer from the current layer to the proximate upper layer (step S14).

When a positive result is obtained at step S14, that is, when it is judged at step S14 that the recognized operation is an operation of returning the menu layer from the current layer to the proximate upper layer, the CPU 21 subtract 1 from the current value of the parameter i representing the menu layer (step S15). For example, if the current menu layer is the second layer, the menu layer is changed to the first layer.

After updating the value of the parameter i representing the menu layer, the CPU 21 verifies whether or not the new value of the parameter i obtained after the updating is 0 so as to judge whether or not an upper layer specified by the new value of the parameter i exists (step S16).

When it is judged at step S16 that the new value of the parameter i is not zero (i.e., i≠0 ), and accordingly that an upper layer specified by the new value of the parameter i exits, the CPU 21 returns to step S2 to newly display options belonging to the upper layer obtained after the updating. Among the newly displayed options belonging to the new upper layer, an option to be designated is the option which exists in the upper layer obtained after the updating and which corresponds to the formerly designated option at the former layer before the updating. For example, if the designated option before the updating was the option "sea wave 01" belonging to the second layer of the function menu "document format", the designated option after the updating becomes the option "background pattern printing" which belongs to the first layer and corresponds to the option "sea wave 01" in the second layer as shown in FIG. 4. By contrast, it is judged at step S16 that the new value of the parameter i is zero i.e., i=0) and accordingly that an upper layer specified by the new value of the parameter i does not exist, the CPU 21 terminates the function menu program and returns to the text input screen.

It should be noted that, when a negative result is obtained at step S14, the CPU 21 judges that the recognized operation is an invalid operation and immediately returns to step S2.

(D) Examples of Display Screen

Next, examples of how the display screen changes as the above-described function menu program is executed will be described with reference to FIGS. 11(A), 11(B), 12(A) and 12(B). In the following, it is assumed that a function key for designating a function menu "document format" is operated in the text input screen.

Also, it is assumed that the CPU 21 accesses the correspondence relation file set 22B shown in FIG. 4 to read a file corresponding to the designated function menu "document format" out of the set of files stored therein. Further, it is assumed that the CPU 21 accesses the explanatory sentence file 22C shown in FIG. 5 or the operation guide file shown in FIG. 6 to read out an explanatory sentence or an operation guide corresponding to a designated option.

(D-1) Explanatory Sentence

First, a case where explanatory sentences are displayed will be described.

Under a state 101 in which a text input screen is displayed, when a function key labeled "format" is operated, the function menu program 22A is activated, so that options belonging to the first layer of the function menu "document format" are displayed (steps S1, S2). Among the displayed options, the option specified by a priority display value (the priority display value is set to a default value or a proximately accessed value) is set to a designated option (the designated option is displayed in a reverse manner) as in state 102 of FIG. 11(A). In state 102, the option "fixed length printing" is displayed in a reverse manner, which means the option "fixed length printing" is designated. This displayed state continues for one second after operating the function key "format" (steps S3-S4-S3).

When one second has passed after operating the function key "format", an explanatory sentence "the length of the entire label is designated", which corresponds to the currently designated option "fixed length printing", is displayed at the right half region (i.e., at the guidance screen region) of the display screen of the liquid crystal display 35 (steps S3-S4-S5-S3). Displaying the explanatory sentence is realized by the following actions executed by the CPU 21. More particularly, the CPU 21 accesses the file named "document format" stored in the correspondence relation file set 22B to find that the information corresponding to the option "fixed length printing" is "7 in the type 1 column" (Hereinafter, the information "7 in the type 1 column" expressed as "Type 1=7". The same rule is applied to the other information.), and then reads the explanatory sentence "length of the entire label is designated" specified by the information "type 1=7", out of the explanatory sentence file 22C shown in FIG. 5.

Figure 11A:
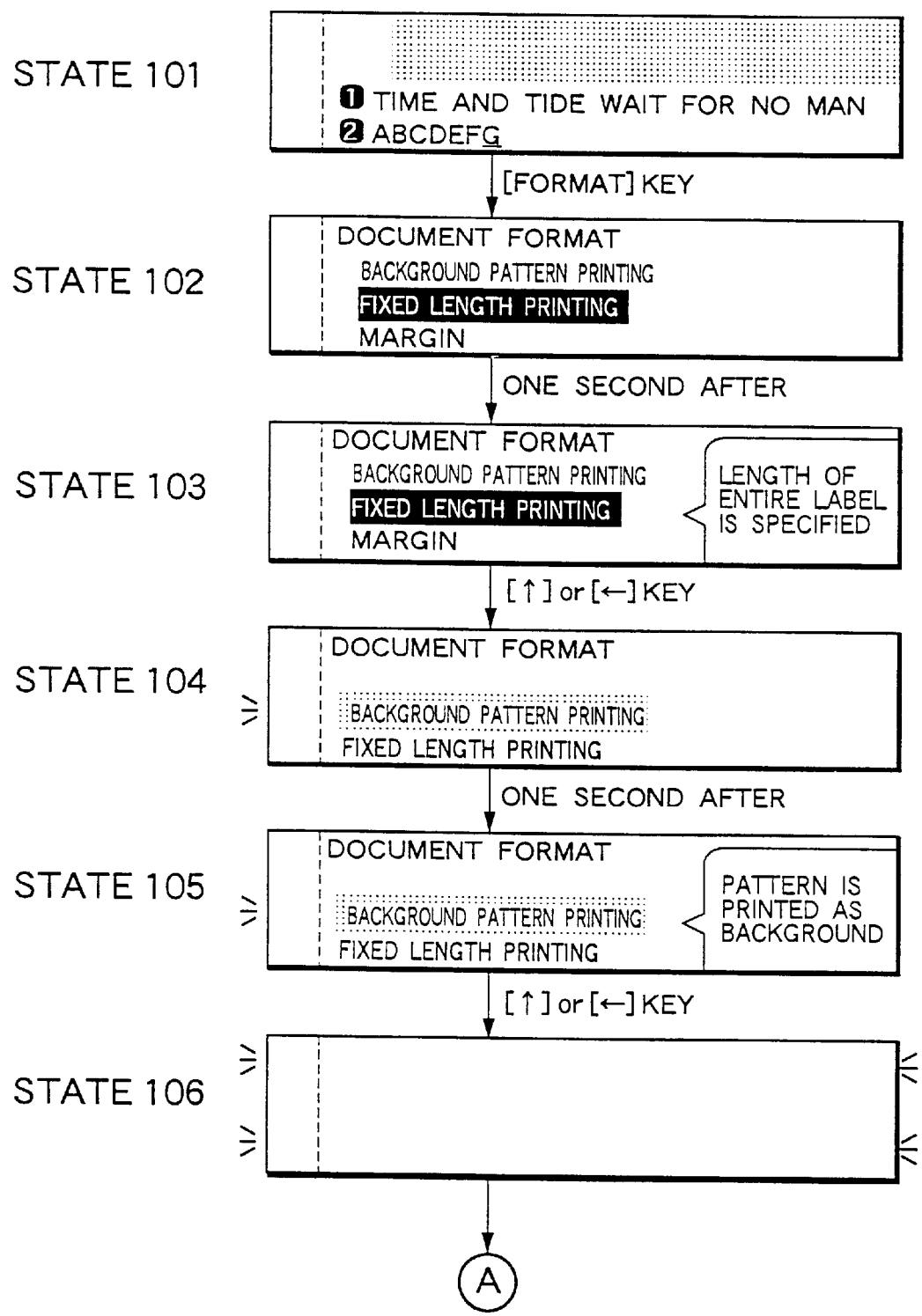
FIG. 11(A), and FIG. 11(B), which is a continuation of the sequence of FIG. 11(A), are views showing how the displayed state at the display screen changes in the case where explanatory sentences are displayed.

Under state 103 of FIG. 11(A), when the user operates either the up arrow key "↑" or the left arrow key "←" to alter the designated option from the current option "fixed length printing" to the proximate upper option "background pattern printing", the option "background pattern printing" is displayed in a blinking manner as in state 104 of FIG. 11(A) (steps S3-S6-S12-S2).

Thereafter, when one second passes since the previous operation of the up or left arrow key, an explanatory sentence "a pattern is printed as the background of the label" corresponding to the option "background pattern printing" is displayed at the right half region (guidance screen region) of the liquid crystal display 35 (steps S3-S4-S5-S3). This display is achieved by the actions of the CPU 21, similarly to the case of the above-described option "fixed length printing". More particularly, the CPU 21 accesses the file named "document format" stored in the correspondence relation file set 22B to find that the information corresponding to the option "background pattern printing" is "type 1=6", and then reads the explanatory sentence "a pattern is printed as the background of the label", which is specified by "type 1=6", out of the explanatory sentence file 22C.

Figure 11B:
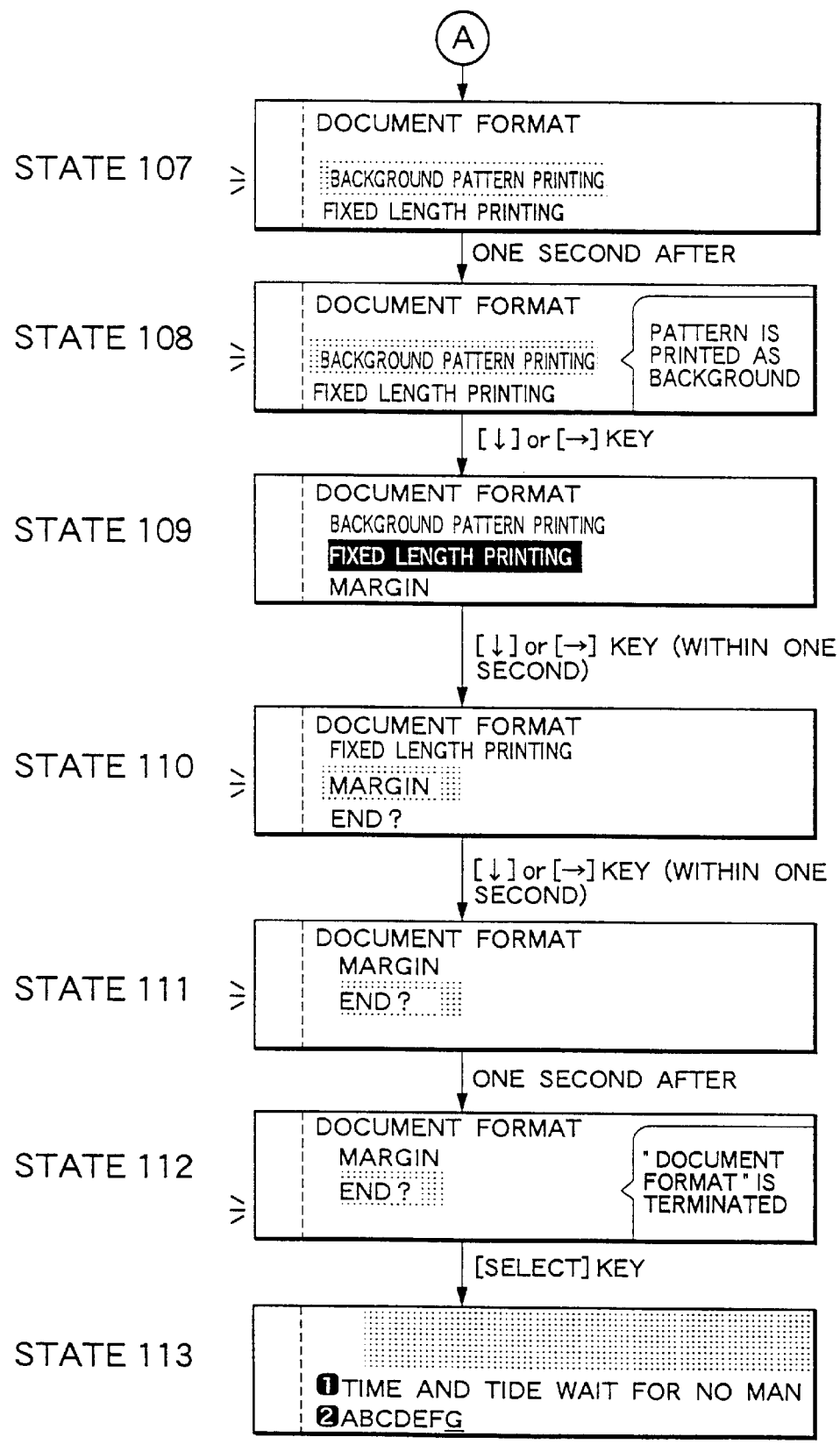

Thereafter, if the user further operates the up or left arrow key with the intention of moving the designation to a further upper option, the CPU 21 regards the operation as an invalid upper one, so that the CPU 21 causes the entire display screen to be displayed in the blinking manner as shown in state 106 of FIG. 11(A) to give the user a warning that the operation is invalid, and then restores the previous display state as shown in state 107 of FIG. 11(B) (steps S3-S6-S12-S14-S2). The CPU 21 regards the operation as an invalid one for the following reasons. That is, the option "background pattern printing" is placed at the head of all the options belonging to the first layer of the function menu "document format". Accordingly, the operation of the up or left arrow key performed at the state shown in state 105 of FIG. 11(A) is regarded as falling on none of the determination operation, the cursor movement operation and the operation of returning to a proximate upper layer.

It should be noted, although the operation of the up or left arrow key performed under state 105 of FIG. 11(A) is regarded as an invalid one, the explanatory sentence disappears from the display screen of the liquid crystal display 35. This is because, as described above, under the state an explanatory sentence or operation guide is being displayed, when a key operation is performed, the display of the explanatory sentence or operation guide is deleted from the display screen of the liquid crystal display 35 in parallel with the actions being performed in response to the key operation.

Thereafter, when one second has passed after performing the previous invalid key operation, the explanatory sentence for the option "background pattern printing" is displayed again as shown in state 108 of FIG. 11(B). Here, if the user again performs the operation of designating the option "fixed length printing", the reverse display shifts from the option "background pattern printing" to the option "fixed length printing". Subsequently, when an operation of designating the next option is performed immediately (within one second) after the previous operation of designating the option "fixed length printing", the designation shifts to the next option "margin" so that the option "margin" is displayed in a blinking manner while the explanatory sentence for the option "fixed length printing" is not displayed, as shown in state 110 of FIG. 11(B) (steps S3-S4-S3-S6-S12-S13-S2). Similarly, when the next option "end" is designated immediately (within one second) after the previous operation of designating the option "margin", the option "end" is displayed in a blinking manner.

Thereafter, when one second passes after the previous operation of designating the option "end", the explanatory sentence is displayed as shown in state 112 of FIG. 11(B). In this state, when the operation of determining the currently designated option "end" is performed, the CPU 21 judges whether or not the second layer for allowing the user to perform range specification exits (step S17). If the second layer exists, the CPU 21 accepts a range specification, and then terminates the function menu program which executes the function menu "document format", and returns to the text input screen as shown in state 113 of FIG. 11(B) (steps S3-S6-S7-S17-S18). By contrast, if the second layer does not exists, the CPU 21 terminates the program as it is and returns to the text input screen.

The above-mentioned descriptions have dealt with an example of transition of the displayed contents and the actions executed correspondingly in the case where explanatory sentences are displayed.

(D-2) Operation Guide

Next, descriptions will be made as to the case where operation guides are displayed.

Similarly to the case of the explanatory sentence, in the case of the operation guide, it is also assumed that the text input screen shown in state 201 of FIG. 12(A) is the initial screen. Under state 201 of FIG. 12(A), when the function key labeled "format" is operated, the function menu program 22A is activated, so that the first layer of the function menu "document format" is displayed as shown in state 202 of FIG. 12(A) (steps S1 and S2).

Here, if the user operates either the up arrow key "↑" or the left arrow key "←" immediately (within one second) after the previous operation of designating the function menu "document format", the reverse display shifts from the option "fixed length printing" to the option "background pattern printing" as shown in state 203 of FIG. 12(A) (S3-S6-S12-S13-S2).

Under state 203 of FIG. 12(A), when the user determines the option "background pattern printing" immediately (within one second) after the operation of the up or left arrow key, options belonging to the one lower layer are displayed as shown in state 204 FIG. 12(A) (steps S3-S6-S7-S8-S9-S2). It should be noted that the "title" displayed at the first line of the display screen is also changed from the function menu name "document format" to the name of the option of the first layer thus determined, and that the first option "NONE 00" is displayed in a reverse manner as shown in state 204 of FIG. 12(A).

Under state 204 of FIG. 12(A), when one second passes after the previous operation, an operation guide shown in state 205 of FIG. 12(A), which corresponds to the currently designated option "NONE 00", is displayed at the right half region (i.e., at the guidance screen region) of the display screen of the liquid crystal display 35 (steps S3-S4-S5-S3). Displaying the operation guide shown in state 205 of FIG. 12(A) is realized by the actions executed by the CPU 21. More particularly, the CPU 21 accesses the file named "document format" stored in the correspondence relation file set 22B to find that the information corresponding to the option "NONE 00" is "A of Type 2" (hereinafter, expressed as "Type 2=A"), and then reads the operation guide specified by the information "Type 2=A" out of the operation guide file 22D shown in FIG. 6.

Under state 206 of FIG. 12(A), when the user operates either the down arrow key "↓" or the right arrow key "→" to alter the designation from the current option "NONE 00" to the proximate lower option "SEA WAVE 01", the option "SEA WAVE 01" is displayed in a blinking manner as shown in state 206 of FIG. 12(A) (step S3-S6-S12-S13-S2).

Thereafter, when one second passes after the operation of the down or right arrow key, an operation guide specified by the information "Type 2=A" corresponding to the option "SEA WAVE 01" is displayed at the right half region (guidance screen region) of the liquid crystal display 35, as shown in state 207 of FIG. 12(A) (steps S3-S4-S5-S3). It should be noted that the operation guides for the options of "SEA WAVE 01" and "NONE 00" are the same because the operation guides for both of the options "NONE 00" and "SEA WAVE 01" are the operation guide specified by the information "Type 2=A" as is known from FIG. 4. This means that possible operations are the same with respect to both of the options of "NONE 00" and "SEA WAVE 01".

Similarly, under the state shown in state 207 of FIG. 12(A), when the user operates the down or right arrow key to alter the designation of option from the current option "SEA WAVE 01" to the proximate lower option "ROHMBUS 02", the blinking display shifts from the option "SEA WAVE 01" to the proximate lower option "ROHMBUS 02" as shown in state 208 of FIG. 12(B) (steps S3-S6-S12-S13-S2). Further, when the user operates the down or right arrow key once again immediately (within one second) after the previous operation of the down or right arrow key, the blinking display further shifts from "ROHMBUS 02" to "ROHMBIC HALF-TONE DOT MESHING 03" as shown in state 209 of FIG. 12(B) (steps S3-S6-S12-S13-S2).

Under state 209 of FIG. 12(B), when one second passes after the previous operation of the down or right arrow key, the operation guide corresponding to the currently designated option "ROHMBIC HALF-TONE DOT MESHING 03" is displayed as in state 210 of FIG. 12(B) (steps S3-S4-S5-S3). Under state 210 of FIG. 12(B), when the currently designated option is determined by operating the selection key, the CPU 21 stores the contents of the determined option, and then switches the options displayed at the display screen from the current options (i.e., the options "ROHMBUS 02", "ROHMBIC HALF-TONE DOT MESHING 03" and "SNOW 04" belonging to the second layer, which are categorized as existing hierarchically under the option "background pattern printing" belonging to the first layer) to the options belonging to the first layer of the present function menu "document format", as shown in state 211 of FIG. 12(B) (steps S3-S6-S7-S8-S9-S10-S11-S2). The operations performed by the user and actions executed by the apparatus to terminates the function menu "sentence document" are the same as the case of the explanatory sentence.

(E) Advantages of the Embodiment

As described above, in the tape printing apparatus according to the present embodiment, if no operation is performed within one second after the performance of the previous operation, an explanatory sentence or operation guide corresponding to the currently designated option is displayed at the guidance screen region which is provided adjacent to the function screen region used for displaying a function menu. Owing to this configuration, usability of the apparatus is further enhanced for the users who are not accustomed to the operations of the apparatus.

On the other hand, a time lag of one second is provided between the performance of the previous operation and the display of the explanatory sentence or operation guide. Owing to this configuration, the user who do not need display of such a guidance (i.e., explanatory sentence or operation guide) can avoid, by performing a next key operation within the one second after the previous key operation, the burdensomeness that such an unnecessary guidance is displayed at the liquid crystal display 35 every time a new option is designated.

(F) Other Embodiments

Hereinabove, the present invention has been described by way of one embodiment of a tape printing apparatus to which the present invention applied. However, embodiments of the present invention are not limited thereto, and various embodiments as described below can be mentioned.

(F-1) In the above-mentioned embodiment, the time taken after the performance of the previous operation until the display of the guidance is fixed to one second. However, the time may be set to another arbitrary value by way of a environmental menu and so on.

(F-2) In the above-mentioned embodiment, if, at the moment when a predetermined period of time elapses after accepting an operation, an explanatory sentence or operation guide corresponding to the operation exists, the explanatory sentence or operation guide is displayed. However, the apparatus may be configured in such a manner that the display of the explanatory sentence or operation guide can be omitted by way of setting. More particularly, the apparatus may be configured in such a manner that the display of both or either of the explanatory sentence and the operation guide is not performed.

Figure 13:
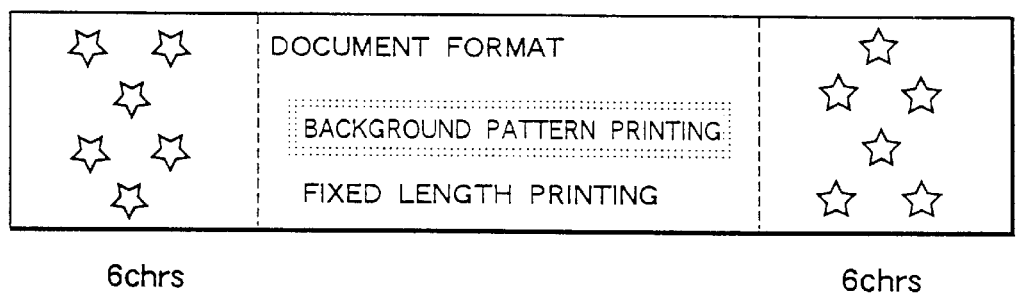
FIG. 13 is a view showing another example of display at the display screen.

It should be noted that, if this configuration is employed, the guidance display screen region becomes unnecessary. Therefore, the apparatus may be configured in such a manner that the function menu is displayed at the center of the liquid crystal display 35 as shown in FIG. 13. In this case, the apparatus may be configured in such a manner that the left and right vacant regions are used as wall paper regions for displaying, as wall paper, patterns, such as pictographs, designated by the user.

It should be noted that, the display of such wall paper may be conducted even in the case where the guidance is displayed, as well as in the case where the guidance is not displayed. In the case where the wall paper is displayed while causing the corresponding guidance to be displayed, it is preferred that low-density wall paper patterns are displayed at the entire display screen so as not to hinder the display of the option.

(F-3) In the above-mentioned embodiment, left half region of the entire display area of the liquid crystal display 35 is allocated to the function screen region, while the right half region thereof is allocated to the guidance screen region. However, the way of allocation of the display screen is not limited thereto.

For example, the function screen region may be made narrower than the guidance screen area, or vice versa. Further, the function screen region and the guidance screen region may be arranged in such a manner that one is located on the top of the other.

In the case where one region is made narrower than the other, it is preferred that the longitudinal dimension of each region is set to a value not smaller than one third of the longitudinal dimension of the entire display screen, and that the transversal dimension of each region is set to a value not smaller than one third of the transversal dimension of the entire display screen. This is because it is necessary for the user to be able to confirm both of the regions on the same display screen. However, if the displaying manner in each region is well devised, or if the number of characters to be displayed is made small, each region may be displayed at a ratio smaller than one third.

(F-4) The above descriptions have mentioned only the case where the explanatory sentences are used only for the options belonging to the first layer. However, options for which explanatory sentences are used are not limited to those belonging to the first layer. Actually, as is known from FIG. 4, with respect to the option of "character background pattern 11" belonging to the second layer, which is located under the option of "background patter printing" belonging to the first layer, an explanatory sentence is provided. Thus, the explanatory sentence may be provided for the options belonging to second or lower layers.

(F-5) In the above description in relation to FIGS. 10(A) and 10(B), the displaying manners of the boundary region (in the case of the above-mentioned embodiment, the picture image display region A2) provided between the function screen region and the guidance screen region are different between the cases of the explanatory sentence and operation guide (specifically, "balloon" in the case of the explanatory sentence, while "enclosure pattern" in the case of the operation guide). However, the displaying manners of the boundary region may be the same with respect to both of the cases. Further, in the case where the boundary region is displayed, the displaying manner is not limited to that employed in the above-mentioned embodiment. Further, such a boundary region may be omitted if it is not necessary.

(F-6) In the above embodiment, as the type of the guidance to be displayed in the guidance screen region, both of the explanatory sentence and the operation guide are provided. However, the type of the guidance to be provided in the apparatus may be limited to one of them. Specifically, the apparatus may by configured in such a manner that, as the original specification of the apparatus, the explanatory sentence is provided but the operation guide is not provided (It should be noted that this configuration is different from a configuration in which the operation guide is provided as the original specification of the apparatus but the display of the operation guide can be inhibited by changing the setting.). Alternatively, the apparatus may by configured in such a manner that, as the original specification of the apparatus, the operation guide is provided but the explanatory sentence is not provided (It should be noted that this configuration is different from a configuration in which the operation guide is provided as the original specification of the apparatus but the display of the operation guide can be inhibited by changing the setting.).

(F-7) In the above embodiment, languages employed for display are the same between the case of the options of the function menu and the case of their corresponding guidance (i.e., explanatory sentences and operation guides), that is, the English language is used for both cases. However, options and their corresponding explanatory sentences may be expressed in different languages. Similarly, options and their corresponding operation guides may be expressed in different languages.

For example, the apparatus may be configured in such a manner that one of the languages is displayed in the native language of the supposed users, the other is displayed in the language used in the country where the user actually lives. If such a configuration is employed, even a user who can understand his native language but cannot understand the language of his living country can operate appropriately by way of the language which he can understand. As examples of such a user, a foreigner who lives in Japan, a Japanese who lives in a foreign country, and a German who lives in an English speaking country. Thus, the usability of the apparatus is greatly enhanced.

(F-8) In the above-mentioned embodiment, the present invention is applied to the tape printing apparatus having a direct printing function of performing direct printing on the tape surface. However, the present invention can be applied to character information processors such as word processors and computers so long as the character information processor is of the type that the number of lines of the character string which can be displayed is limited to several lines.

(F-9) In the above-mentioned embodiment, the present invention is applied to a tape printing apparatus having a function of performing direct printing to the tape surface, but the present invention can be applied to a stamp producing apparatus.

Advantages of the Invention

As described above, according to the first aspect of the present invention, in a function mode in which a function is selected, a display area of the display means is divided into at least a function display region and a guidance display region. Also, at the function display region, options of the function menu are displayed in a hierarchical manner, while at the guidance display region, an explanatory sentence corresponding to an option designated out of the options displayed at the function display region. Owing to this constitution, the user can perform a job while confirming the contents of the job displayed in the same display area, so that the usability is greatly enhanced.

According to the second aspect of the present invention, in a function mode in which a function is selected, a display area of the display means is divided into at least a function display region and a guidance display region. Also, at the function display region, options of the function menu are displayed in a hierarchical manner, while at the guidance display region, an operation guide corresponding to an option designated out of the options displayed at the function display region. Owing to this constitution, the user can perform a job while confirming the contents of the job displayed in the same display area, so that the usability is greatly enhanced.

Further, according to the third aspect of the invention, the function obtained by combining the functions according to the first and second aspects of the invention, so that operation efficiency is further enhanced.

Further, according to the fourth aspect of the invention, to each of the first to third aspects of the invention, under the function mode, there is added a function by which a guidance or operation guide is displayed if no operation is performed within a predetermined period of time after performance of the previous operation. Owing to this constitution, even where the user is the type of person who wishes to cause the explanation sentence or operation guide to be displayed only when he needs it, the apparatus can satisfy the wish of the user of this type.

Further, according to the fifth aspect of the present invention, to the first or second aspect of the present invention is added a function of displaying the options displayed at the function display region and the explanatory sentence displayed at the guidance display region are displayed in different languages. Owing to this constitution, even when the user of the apparatus can understand his native language but cannot understand the language of the country where he lives, he can perform an appropriate operation based on the language which he can understand.

Similarly, according to the sixth aspect of the present invention, to the first or second aspect of the present invention is added a function of displaying the options displayed at the function display region and the operation guide displayed at the guidance display region are displayed in different languages. Owing to this constitution, even when the user of the apparatus can understand his native language but cannot understand the language of the country where he lives, he can perform an appropriate operation based on the language which he can understand.

It should be noted that, since the present invention is not limited to the above-described embodiments and modifications, the scope of the invention is to be determined solely by the appended claims.

What is claimed is:

1. A character information processor for a tape printing apparatus including display means having a display area in which a limitation is imposed on an allowable number of lines of a character string to be displayed, comprising:
   means for dividing the display area into at least a function display region and a guidance display region in a function mode in which a function is selected; and
   means for displaying, at the function display region, options of a function menu in a hierarchical manner, and for displaying, at the guidance display region, an explanatory sentence corresponding to an option designated out of the options displayed at the function display region; said explanatory sentence describing the designated option.

2. The character information processor according to claim 1, further comprising means for displaying, at the function display region, an operation guide instead of an explanatory sentence when the option designated out of the options displayed at the function display region is a predetermined option; said operation guide being an illustration setting forth one or more key operations associated with the designated option.

3. The character information processor according to claim 2 wherein, when no key operation is performed within a predetermined period of time after performance of a previous operation in the function mode, either an explanatory sentence or an operation guide is displayed.

4. The character information processor according to claim 2 wherein the option and the explanatory sentence are displayed in different languages.

5. The character information processor according to claim 2 wherein the option and the operation guide are displayed in different languages.

6. The character information processor according to claim 1, wherein, when no key operation is performed within a predetermined period of time after performance of a previous operation in the function mode, either an explanatory sentence or an operation guide is displayed.

7. The character information processor according to claim 1, wherein the option and the explanatory sentence are displayed in different languages.

8. A character information processor for a tape printing apparatus including display means having a display area in which a limitation is imposed on an allowable number of lines of a character string to be displayed, comprising:
   means for dividing the display area into at least a function display region and a guidance display region in a function mode in which a function is selected; and
   means for displaying, at the function display region, options of the function menu in a hierarchical manner, and for displaying, at the guidance display region, an operation guide corresponding to an option designated out of the options displayed at the function display region; said operation guide being an illustration setting forth one or more key operations associated with the designated option.

9. The character information processor according to claim 8, wherein the option and the operation guide are displayed in different languages.

10. The character information processor according to claim 8 wherein, when no key operation is performed within a predetermined period of time after performance of a previous operation in the function mode, either an explanatory sentence or an operation guide is displayed.

11. The character information processor according to claim 2 wherein the options are set in a file arrangement defining a plurality of hierarchical layers wherein each option is further defined as associated with one of a plurality of explanatory sentences or one of a plurality of operation guides.

* * * * *

UNITED STATES PATENT AND TRADEMARK OFFICE
CERTIFICATE OF CORRECTION

PATENT NO. : 6,593,948 B1
DATED : July 15, 2003
INVENTOR(S) : Suetani et al.

It is certified that error appears in the above-identified patent and that said Letters Patent is hereby corrected as shown below:

Column 7,
Line 23, "region:" should read -- region --.

Signed and Sealed this

Eighteenth Day of May, 2004

JON W. DUDAS
*Acting Director of the United States Patent and Trademark Office*